Dec. 2, 1952 A. MACKMANN ET AL 2,619,845
SYSTEM OF TOOTHED GEARING
Filed Jan. 7, 1950 2 SHEETS—SHEET 1

Inventors:
Arthur Mackmann
and Bertel S. Nelson,
By Dawson, Ooms, Borthwick Spangenberg,
Attorneys Dec. 2, 1952 A. MACKMANN ET AL 2,619,845
SYSTEM OF TOOTHED GEARING
Filed Jan. 7, 1950 2 SHEETS—SHEET 2
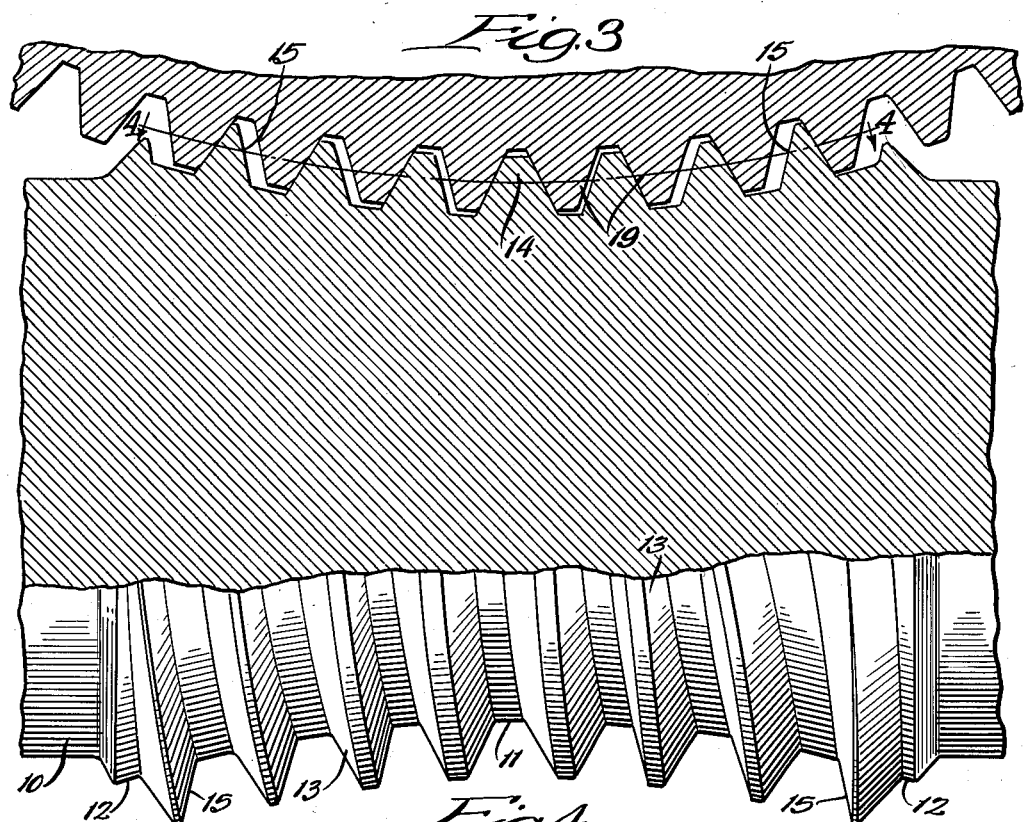
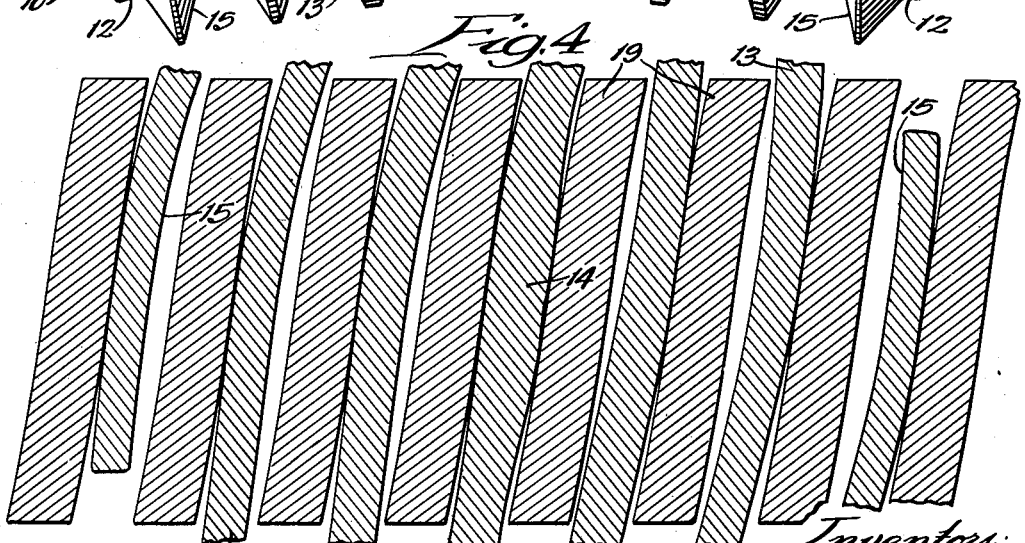

Patented Dec. 2, 1952

2,619,845

UNITED STATES PATENT OFFICE 2,619,845

SYSTEM OF TOOTHED GEARING

Arthur Mackmann and Bertel S. Nelson, Chicago, Ill., assignors to Foote Bros. Gear and Machine Corporation, Chicago, Ill., a corporation of Delaware Application January 7, 1950, Serial No. 137,444

6 Claims. (Cl. 74—458)

This invention relates to a system of toothed gearing and more particularly to an improved system of double enveloping worm gearing.

In double enveloping worm gearing as heretofore proposed the worm thread has been of substantially uniform contour throughout the length of the worm. This has required barrel shaped teeth on the gear or wheel which are relatively weak and which are extremely difficult to machine.

With gearing of this type the major portion of the contact is at the arc of approach end of the worm, that is, the end which is first engaged by the gear or wheel teeth. This means that the end turn of the thread at the arc of approach end of the worm has the maximum area of contact with the wheel teeth and the area gradually decreases to a point of minimum area in the center of the wheel teeth at the opposite or arc of recession end of the worm. As used herein the arc of recession end of the worm means that portion of the worm from its center plane to the end which is last engaged by a wheel tooth and the surfaces are considered to be in contact when they are in such close proximity that the lubricating oil film will transmit load between them.

This type of gearing produces a heavy initial contact between the approach end of the worm thread and the wheel teeth. Unless the worm and wheel are accurately mounted shock may be produced which will damage either the worm or the gear. In addition, this type of initial contact tends to remove the lubricant so that it is difficult to maintain a proper lubricant film between the mating surfaces.

The present invention provides a system of double enveloping worm gearing which substantially reduces or entirely eliminates the difficulties with prior types of gearing, particularly in high ratio gearing where the difficulties are most pronounced.

One of the objects of the invention is to provide a system of gearing in which both the worm and the wheel can be formed accurately and inexpensively with a minimum of special tooling or unusual machining operations.

Another object is to provide a system of gearing in which the worm and wheel are in contact only through the arc of recession of the worm. While this reduces the number of teeth in contact, the total contact area is only very slightly less than in a conventional double enveloping worm and gear set and the present system provides other advantages which give it a capacity as high as or higher than a conventional double enveloping gear set of comparable size.

Still another object is to provide a system of gearing in which a very gradual initial contact is obtained between the worm and the gear. This not only eliminates shock but assists in feeding lubricant into the contacting areas and makes the gear set easier to mount by providing a greater degree of tolerance in the relative positions of the gear elements.

A further object is to provide a worm for use in a double enveloping worm and gear set in which the thread is cut away or relieved on the side adjacent to the center plane from the center plane outward toward the ends of the gear. Such a worm is relatively easy to make and produces contact only through the arc of recession.

A still further object is to provide a gear or wheel in which the teeth are thicker at their ends than in their central portions. This type of tooth is very simply formed by a single flytool operation and is substantially stronger than the conventional tooth shape for double enveloping worm and gear sets.

The above and other objects and advantages of the invention will be more readily apparent when read in connection with the accompanying drawings, in which—

Figure 3 is a partial section in a plane including the worm axis and perpendicular to the wheel axis showing the tooth mesh; and Figure 4 is a developed view on the pitch line of the meshing worm and wheel illustrating the type of contact.

Figures 1, 2:
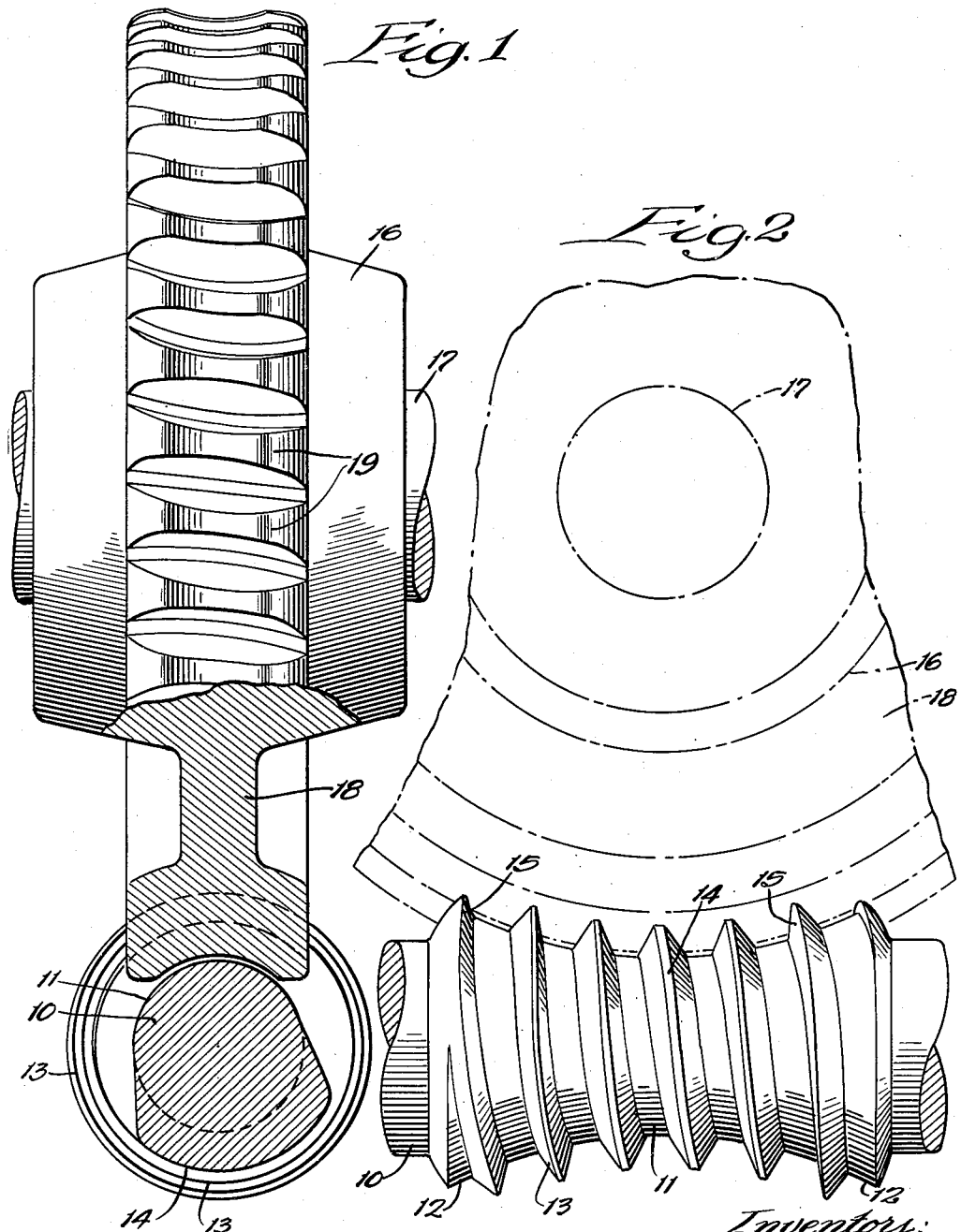
Figure 1 is a view of a worm and gear set embodying the invention showing the gear or wheel partly in section and partly in elevation and the worm in transverse section.
Figure 2 is a side elevation of the worm indicating the mating wheel in dotted lines.

The gear set as shown comprises an hourglass type worm and an intermeshing toothed wheel. The worm comprises a shaft 10 on which a shaped body is integrally formed or detachably mounted as preferred. The body has a central portion 11 of minimum diameter and tapers in a smooth curve to end portions 12 of maximum diameter. When assembled with a wheel the portion 11 constituting the center of the worm lies in the center plane of the gearing; that is, a plane including the wheel axis and perpendicular to the worm axis.

The worm body carries one or more threads indicated generally at 13, there being only a single thread on the worm shown. The thread is of maximum or full thickness at the point of intersection thereof with the center plane of the gearing as indicated at 14 in Figure 2. The side of the thread adjacent the center plane toward both ends of the gear is cut away gradually to decrease the thickness of the thread, as shown at 15. With this construction the outer face of the thread at both ends follows the contour of a standard double enveloping worm but the inner face is cut away to eliminate interferences normally produced with the mating teeth on the wheel.

The wheel comprises a hub 16 for mounting on a shaft 17 transverse to and spaced from the worm axis and a rim portion 18 formed with a series of spaced teeth 19 shaped to intermesh with the worm thread. The rim portion of the gear is dished or curved inward partially to envelope the worm, as best seen in Figure 1.

The teeth 19 on the wheel according to the present invention can be formed in a single operation by a flytool whose profile corresponds to the profile of the worm thread at the center plane. As best seen in Figures 1 and 4 this produces a tooth 19 which is slightly narrower in the center portion of the gear width than at the tooth ends due to the fact that the ends of the tooth lie at slightly greater radius than the center portion. Teeth of this type can be formed very inexpensively and accurately by a single flytool machining operation without any special finishing such as special hobbing operations. Furthermore, such teeth are substantially stronger than the usual barrel shaped teeth required in conventional double enveloping gears.

The type of engagement or contact produced between the worm thread and the teeth 19 on the wheel is illustrated in Figures 3 and 4. As best seen in Figures 3 and 4 the center portion 14 of the worm thread is the first to contact the mating surface of the gear tooth 19 in the normal condition of the worm driving the gear. Due to the cutting away of the thread at 15 the portions of the thread spaced from the center plane contact the teeth 19 on the wheel only through the arc of approach. This is apparent from both Figures 3 and 4. Figure 4 further illustrates that the major area of contact occurs at the center portion 14 of the worm thread and that the contact area progressively decreases slightly toward the ends of the worm. However, the total contact area through the arc of recession of the worm is only slightly less than the total contact area in a conventional double enveloping gear set so that the gear capacity from this standpoint is substantially the same.

From Figure 4 it will be apparent that the space between the worm thread and wheel teeth at the arc of approach side decreases very gradually until a drive contact is obtained. Due to this feature the load is picked up gradually and smoothly by the teeth to eliminate all shock. Furthermore, the gradually decreasing space tends to feed lubricant into the contact area so that an adequate lubricant film is maintained more easily than with conventional double enveloping gearing. These factors plus the additional factor of higher strength gear teeth produce a rated capacity for the present gear set higher than that of a conventional double enveloping gear set of comparable size. In addition, because the load is always picked up without shock and because the arc of approach end of the worm is ineffective the mounting of the worm and wheel are not as critical as with conventional double enveloping gearing.

Although a double ended worm has been shown, it will be apparent that where operation in one direction only is required, the arc of approach end of the worm may be omitted entirely.

While one embodiment of the invention has been shown and described in detail herein, it will be understood that this is illustrative only and is not to be taken as a definition of the scope of the invention, reference being had for this purpose to the appended claims.

What is claimed is:

1. A system of gearing comprising a worm of the hourglass type and an intermeshing toothed wheel, the worm having a thread thereon which is of full thickness at the center plane of the worm and which decreases in thickness away from the center plane, and the wheel having teeth thereon meshing with said thread and the spaces between which are of uniform contour throughout the width of the wheel.

2. A system of gearing comprising a worm of the hourglass type and an intermeshing toothed wheel, the worm having a thread thereon which is of full thickness at the center plane of the worm and which is cut away on the arc of approach side to decrease the thickness of the thread at points spaced from the center plane, and the wheel having teeth thereon meshing with the thread and whose thickness at the pitch line increases from their centers toward their ends.

3. A system of gearing comprising a worm of the hourglass type and an intermeshing toothed wheel, the worm having a thread thereon which is of full thickness at the center plane of the worm and which is cut away on the arc of approach side to decrease the thickness of the thread at points spaced from the center plane, and the wheel having teeth thereon meshing with the thread and which are dished inward centrally of the wheel and are of greater thickness at their ends than at their central portions.

4. In a system of gearing, a worm of the hourglass type comprising a body tapering from maximum diameter at its ends to a minimum diameter at its central portion, and a thread on the body of maximum thickness at the center of the body and gradually decreasing in thickness toward the ends of the body.

5. In a system of gearing, a worm of the hourglass type comprising a body tapering from maximum diameter at its ends to a minimum diameter at its central portion, and a thread on the body of maximum thickness at the center of the body and cut away to a gradually increasing extent from the center toward the ends of the body on the sides thereof adjacent to the center of the body.

6. In a system of gearing, a worm comprising a body tapering from a minimum diameter at the center plane of the gearing to a maximum diameter at the end of the body, and a thread on the body of maximum thickness at the center plane and gradually cut away on the side thereof facing the center plane to decrease its thickness from the center plane toward the end of the body.

ARTHUR MACKMANN.
BERTEL S. NELSON.

REFERENCES CITED

The following references are of record in the file of this patent:

UNITED STATES PATENTS

| Number | Name | Date |
|---|---|---|
| 2,338,367 | Trbojevich | Jan. 4, 1944 |

OTHER REFERENCES

"Practical Treatise On Gearing," 1929 (Brown & Sharpe Mfg. Co., page 115).